US012716235B2

(12) United States Patent
Pospisil

(10) Patent No.: US 12,716,235 B2
(45) Date of Patent: Aug. 25, 2026

(54) CLT BUILDING ACOUSTIC SPRINKLER DROP FLOORING SYSTEM

(71) Applicant: UNITED STATES GYPSUM COMPANY, Chicago, IL (US)

(72) Inventor: Frank Pospisil, Oak Park, IL (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 236 days.

(21) Appl. No.: 18/538,377

(22) Filed: Dec. 13, 2023

(65) Prior Publication Data

US 2024/0376711 A1 Nov. 14, 2024

Related U.S. Application Data

(60) Provisional application No. 63/501,769, filed on May 12, 2023.

(51) Int. Cl.

*E04C 2/52* (2006.01)
*A62C 35/68* (2006.01)
*E04C 2/24* (2006.01)

(52) U.S. Cl.

CPC .............. *E04C 2/521* (2013.01); *A62C 35/68* (2013.01); *E04C 2/243* (2013.01)

(58) Field of Classification Search

CPC ......... E04C 2/243; E04C 2/521; A62C 35/68; E04F 2201/0511; E04F 2201/0517
USPC ................................. 52/39, 402, 403.1, 480
See application file for complete search history.

(56) References Cited

U.S. PATENT DOCUMENTS

| | | | | | |
|---|---|---|---|---|---|
| 1,465,383 | A * | 8/1923 | Walsh | B27M 1/02 | 16/DIG. 18 |
| 1,693,655 | A * | 12/1928 | Murphy | E04F 15/20 | 52/480 |
| 1,745,171 | A * | 1/1930 | Kocher | E04F 15/20 | 52/480 |
| 2,578,781 | A * | 12/1951 | Brundige | B27D 1/08 | 428/56 |
| 3,662,509 | A * | 5/1972 | Studzinski | E04D 13/1618 | 52/404.1 |
| 3,811,237 | A * | 5/1974 | Bettinger | E04F 15/02452 | D25/119 |

(Continued)

FOREIGN PATENT DOCUMENTS

| | | | |
|---|---|---|---|
| EP | 2871056 | A1 | 5/2015 |
| EP | 3385463 | A1 | 10/2018 |

(Continued)

OTHER PUBLICATIONS

International Search Report and Written Opinion received for PCT/US2024/028096, mailed Jul. 12, 2024.

*Primary Examiner* — James M Ference

(74) *Attorney, Agent, or Firm* — Pradip Sahu; Greer, Burns & Crain, Ltd

(57) ABSTRACT

A composite flooring system includes a cross-laminated timber (CLT) subfloor including a plurality of drop holes, a plurality of isolators disposed on top of and attached to the CLT subfloor, a sprinkler main of a sprinkler system disposed between the plurality of isolators, a plurality of sprinkler drops attached to the sprinkler main which extend through the drop holes of the CLT subfloor, a plurality of metal inverted tracks attached to a top surface of the plurality of isolators, and an upper flooring attached to a top surface of the metal inverted tracks.

19 Claims, 2 Drawing Sheets

(56) References Cited

U.S. PATENT DOCUMENTS 3,815,821 A * 6/1974 Metcalfe ................ A62C 37/09 169/37
3,857,446 A * 12/1974 Kenny .................... F16K 17/38 169/37
3,899,857 A * 8/1975 Mochizuki ........ E04F 15/02452 52/347
4,007,877 A * 2/1977 Jackson ................. A62C 37/09 239/281
4,569,873 A * 2/1986 Robbins ................... B27N 3/06 428/106
4,589,243 A * 5/1986 Abendroth ............ E04B 1/0007 52/480
4,629,523 A * 12/1986 Wetterwald ............. B32B 19/04 428/113
4,635,424 A * 1/1987 Drapeau ............. E04F 13/0812 52/510
4,682,459 A * 7/1987 Stephenson ............. E04F 15/22 52/390
4,742,654 A * 5/1988 Cole ......................... E04B 5/12 D25/138
4,831,806 A * 5/1989 Niese .................... E04F 15/186 52/391
4,879,856 A * 11/1989 Jones ...................... E04F 15/20 52/489.1
4,890,434 A * 1/1990 Niese .................... E04F 15/225 52/480
4,930,280 A * 6/1990 Abendroth .............. E04F 15/22 52/480
5,097,906 A * 3/1992 Polan ..................... A62C 37/08 285/46
5,111,627 A * 5/1992 Brown .............. E04F 15/02016 52/126.5
5,277,010 A * 1/1994 Stephenson ........... E04F 15/225 52/480
5,303,526 A * 4/1994 Niese .................... E04F 15/225 52/480
5,366,022 A * 11/1994 Meyer .................... A62C 37/08 169/37
5,377,471 A * 1/1995 Niese ...................... E04F 15/22 D25/138
5,388,380 A * 2/1995 Niese ...................... E04F 15/22 52/480
5,452,551 A * 9/1995 Charland ............... A62C 2/065 52/220.8
5,465,548 A * 11/1995 Niese ...................... E04F 15/22 29/897.3
5,513,708 A * 5/1996 Sundholm .......... A62C 99/0072 251/282
5,570,745 A * 11/1996 MacDonald, III ..... A62C 35/68 169/37
5,778,621 A * 7/1998 Randjelovic ............ E04F 15/22 52/480
5,906,082 A * 5/1999 Counihan ......... E04F 15/02194 52/480
6,055,785 A * 5/2000 Counihan ............... E04F 15/22 52/480
6,115,981 A * 9/2000 Counihan ............... E04F 15/22 52/489.1
6,162,312 A * 12/2000 Abney ................. B27M 3/0086 156/154
6,164,031 A * 12/2000 Counihan ............... E04F 15/02 52/489.1
6,363,675 B1 * 4/2002 Shelton ................. E04F 15/225 52/302.1
6,620,487 B1 * 9/2003 Tonyan ................... C04B 28/18 106/735
6,742,312 B2 * 6/2004 Valentine .............. E04F 15/225 52/480
7,093,814 B2 * 8/2006 Meisel ...................... F16F 1/44 52/480
7,670,520 B2 * 3/2010 Dubey .................... B28B 1/522 264/172.19
7,735,280 B2 * 6/2010 Valentine .................. F16F 1/44 52/480
8,030,377 B2 * 10/2011 Dubey .................... C04B 28/02 524/5
8,038,790 B1 * 10/2011 Dubey ................ B28B 19/0092 106/711
8,927,085 B2 * 1/2015 Burton ..................... B27N 3/04 428/105
9,151,042 B2 * 10/2015 Simon .................... A62C 2/065
10,131,119 B2 * 11/2018 Freres ..................... B32B 37/18
10,370,860 B2 8/2019 Socha
10,464,294 B2 * 11/2019 Freres ....................... B32B 7/03
2003/0079425 A1 * 5/2003 Morgan ................ E04B 2/7411 52/232
2004/0045234 A1 * 3/2004 Morgan .............. E04D 13/1656 52/232
2004/0117053 A1 * 6/2004 Kirschner ............. A61B 1/247 700/117
2007/0000198 A1 * 1/2007 Payne, Jr. ................. E04B 5/40 52/414
2007/0289238 A1 * 12/2007 Payne ..................... E04F 15/20 52/408
2008/0104915 A1 * 5/2008 Randjelovic .......... E04F 15/225 52/779
2010/0077684 A1 * 4/2010 Socha ..................... B32B 5/022 52/403.1
2013/0306334 A1 * 11/2013 Koiwa ................... A62C 35/00 169/51
2013/0307225 A1 * 11/2013 Boyd ..................... H02G 3/185 277/626
2014/0367477 A1 * 12/2014 Cha ................... E04F 15/02464 52/126.6
2015/0013240 A1 * 1/2015 Malakauskas ............ E04C 2/46 52/79.9
2015/0050443 A1 * 2/2015 Roy ........................ E04C 2/246 428/114
2015/0083442 A1 * 3/2015 Koiwa ................... A62C 35/68 169/37
2017/0113442 A1 * 4/2017 Freres ................... B32B 21/042
2017/0299198 A1 * 10/2017 Collins ..................... E04B 5/48
2018/0328019 A1 * 11/2018 Collins ............... E04B 1/34853
2019/0168410 A1 * 6/2019 Conboy .................... E04B 1/10
2019/0169838 A1 * 6/2019 Conboy .................... E04C 3/14
2019/0169840 A1 * 6/2019 Conboy .................... B32B 3/14
2020/0215784 A1 * 7/2020 Kuhn ...................... E04C 2/521
2022/0339915 A1 * 10/2022 Mullet .................... B32B 13/14
2024/0376711 A1 * 11/2024 Pospisil .................. E04C 2/521

FOREIGN PATENT DOCUMENTS

JP H05230984 A 9/1993
JP 2003062809 A 3/2003
JP 2021173020 A 11/2021

* cited by examiner

CLT BUILDING ACOUSTIC SPRINKLER DROP FLOORING SYSTEM

RELATED APPLICATION

The present application claims 35 USC 119 priority from U.S. Provisional Application Ser. No. 63/501,769 filed May 12, 2023, the contents of which are incorporated by reference herein.

BACKGROUND

The present disclosure relates generally to flooring systems, and more specifically to cross-laminated timber (CLT) building acoustic sprinkler drop flooring systems.

CLT panels are prefabricated, solid engineered wood panels which are made of layered lumber boards (usually three, five, or seven) stacked crosswise at 90-degree angles and glued into place. Finger joints and structural adhesive connect the boards, which are typically between ⅝ inch to 2 inches thick. The CLT panels can be manufactured at custom dimensions, although transportation restrictions dictate their length.

Alternating grains improve the dimensional stability of CLT panels. This strength affords designers a host of new uses for wood, including wide prefabricated floor slabs, single-level walls, and taller floor plate heights. As with other mass timber products, CLT is often left exposed in building interiors, and is used in subfloors for building having 8 stories or more, offering additional aesthetic attributes. As a result, buildings with CLT flooring systems typically will not use gypsum wallboard in the ceiling below the CLT flooring system, as the gypsum wallboard would hide the CLT panels.

Thus, the ceilings within buildings having CLT flooring systems typically do not include a plenum that aids in absorbing noise coming through the floor and ceiling assembly from above. Without the concealed space within the plenum, conventional CLT flooring systems do not include insulation which absorbs noise from the floor above.

In structural systems, such as walls, floors, and roofs, CLT panels serve as load-bearing elements. In floor and roof applications, the lumber used in the outer layers is oriented so its fibers are parallel to the direction of the span. CLT is also used as a prefabricated building component, accelerating construction timelines.

As noted above, most buildings which have CLT subfloors do not have drywall ceilings and are required to use active fire suppression sprinkler systems. As a result, unsightly sprinkler systems are run through the ceiling space in these buildings and are not concealed from view. Accordingly, the aesthetic appearance of the CLT subfloor is offset by the unattractive appearance of the sprinkler system.

Additionally, sound rated floors are typically evaluated by ASTM Standard E492 and are rated as to impact insulation class (IIC). The greater the IIC rating, the less impact noise will be transmitted to the area below. Floors may also be rated as to Sound Transmission Class (STC) per ASTM E90. The greater the STC rating, the less airborne sound will be transmitted to the area below. Sound rated floors typically are specified to have an IIC rating of not less than 50 and an STC rating of not less than 50. Many building codes require an IIC rating of 50 or higher, which is difficult to attain for buildings which utilize CLT for the subfloor. Moreover, even though an IIC rating of 50 meets many building codes, experience has shown that in luxury condominium applications, even floor-ceiling systems having an IIC of 56-57 may not be acceptable because some impact noise is still audible.

Accordingly, there is the need for a CLT flooring system which addresses the above-listed drawbacks.

SUMMARY

The above-listed need is met or exceeded by the present cross-laminated timber (CLT) building acoustic sprinkler drop flooring system. In particular, the present CLT building acoustic sprinkler drop flooring system hides unsightly sprinkler systems in the acoustic floor cavity, such that only the sprinkler heads are exposed. Specifically, the sprinkler mains, the sprinkler sub-mains, and the sprinkler drops, with the exception of the sprinkler heads, are concealed in a space between the sub floor and an upper flooring. The upper flooring preferably includes at least one layer of structural panels, such as cross-laminated ½ inch STRUCTO-CRETE® panels, elevated on isolators. A "structural" panel, as used herein, is capable of supporting its own weight without visible sagging, bending, or collapsing when supported only at the edges of the panel as in a floor and ceiling assembly. Then, the sprinkler drops, which are connected to the sprinkler main, are run through drop holes in the CLT subfloor with only the sprinkler heads protruding out of the ceiling below.

The drop holes are sealed from fire and smoke spread with a through penetration fire-stop. In particular, the space between an edge of the drop hole and the sprinkler drop is filled or sealed with a combination of intumescent caulk and slurry. Intumescent caulk expands significantly when it experiences increases in temperature, slowing the spread of smoke and flames. Additionally, this combination of intumescent caulk and slurry provides improved sound reduction.

Conventional flooring systems which provide drop holes within the subfloor for the sprinkler drops use a metal collar filled with intumescent caulk to fill the space between an edge of the drop holes and the sprinkler drops. However, this approach provides inferior sound reduction of the flooring system, and is less effective at reducing the spread of fire and smoke.

More specifically, a composite flooring system includes a cross-laminated timber (CLT) subfloor with a plurality of drop holes, a plurality of isolators disposed on top of and attached to the CLT sub floor, a sprinkler main of a sprinkler system disposed between the plurality of isolators, a plurality of sprinkler drops attached to the sprinkler main which extend through the drop holes of the CLT sub floor, a plurality of metal inverted tracks attached to a top surface of the plurality of isolators, and an upper flooring attached to a top surface of the metal inverted tracks.

In preferred embodiments, the CLT subfloor has five layers of CLT panels, such that successive layers are stacked in a perpendicular orientation, and the upper flooring has two layers of structural panels stacked in a perpendicular orientation or in a parallel orientation with staggered joints between the layers of structural panels. Preferably, the two layers of structural panels are attached with an adhesive and the isolators are at least two inches tall, and preferably still at least four inches tall.

In an alternate preferred embodiment, the upper flooring includes a layer of structural panels with a poured underlayment above the layer of structural panels. Preferably, the upper flooring includes a sound mat disposed between the layer of structural panels and the poured underlayment.

In another preferred embodiment, a space between an outer edge of the drop holes in the CLT subfloor and the sprinkler drops is filled with a layer of intumescent caulk or similar material and a gypsum filler. Preferably, a space between the CLT subfloor and the upper flooring is filled with insulation. Preferably still, the acoustic isolators are spaced 24 inches apart.

In yet another preferred embodiment, a sprinkler head of the sprinkler drop is the only portion of the sprinkler system not concealed by the CLT subfloor.

A second embodiment of the present disclosure is a method of assembling a composite flooring system, the method including providing a CLT subfloor, drilling a plurality of drop holes through the CLT subfloor, attaching a plurality of isolators to a top surface of the CLT subfloor, disposing a sprinkler main of a sprinkler system between the plurality of isolators, disposing a plurality of sprinkler drops of the sprinkler system through the drop holes, attaching a plurality of metal inverted tracks to a top surface of the plurality of isolators, and attaching an upper flooring to a top surface of the metal inverted tracks.

In a preferred embodiment, the method also includes applying an adhesive between the two layers of structural panels, and fastening the two layers of structural panels to the metal inverted tracks until the adhesive has cured.

In another preferred embodiment, the method of also includes filling a space between an outer edge of the drop holes in the CLT subfloor and the sprinkler drops with a layer of intumescent caulk, and filling the remainder of the space between the outer edge of the drop holes in the CLT subfloor and the sprinkler drops with a gypsum filler.

In yet another preferred embodiment, the method also includes filling a space between the CLT subfloor and the upper flooring with insulation.

DETAILED DESCRIPTION

Figure 1A:
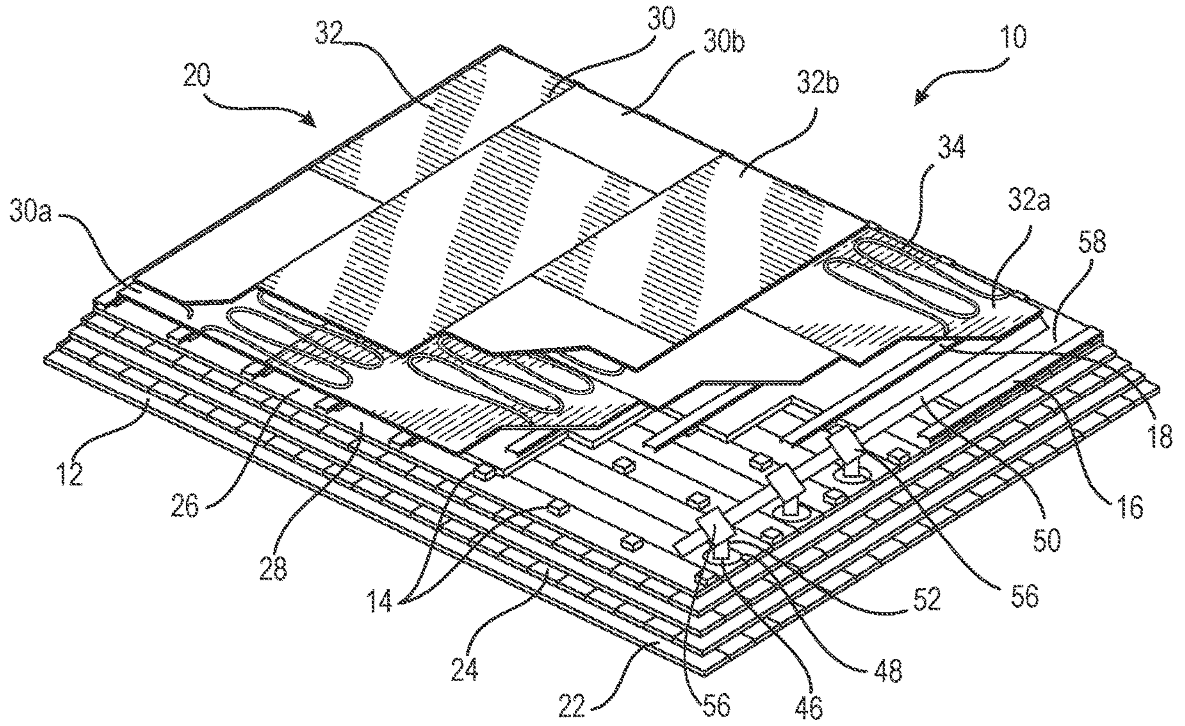
FIG. 1A is a top fragmentary perspective view of a first embodiment of the present cross-laminated timber (CLT) building acoustic sprinkler drop flooring system.
Figure 1B:
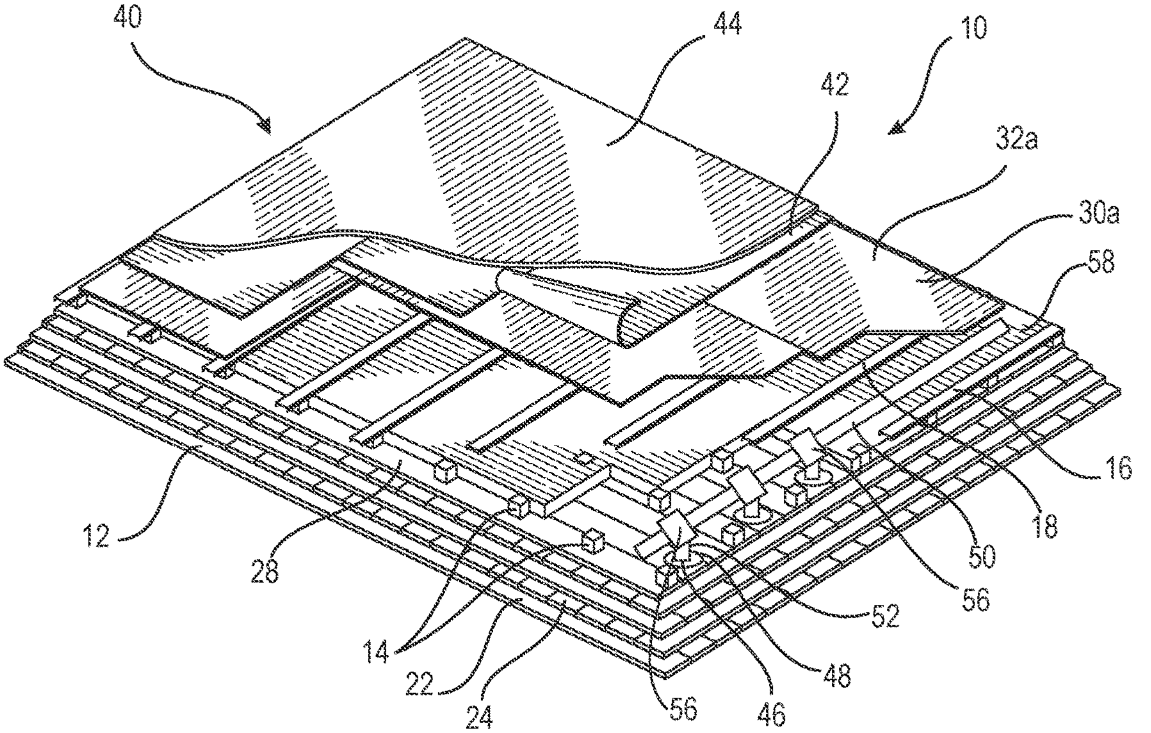
FIG. 1B is a top fragmentary perspective view of a second embodiment of the present CLT building acoustic sprinkler drop flooring.
Figure 2:
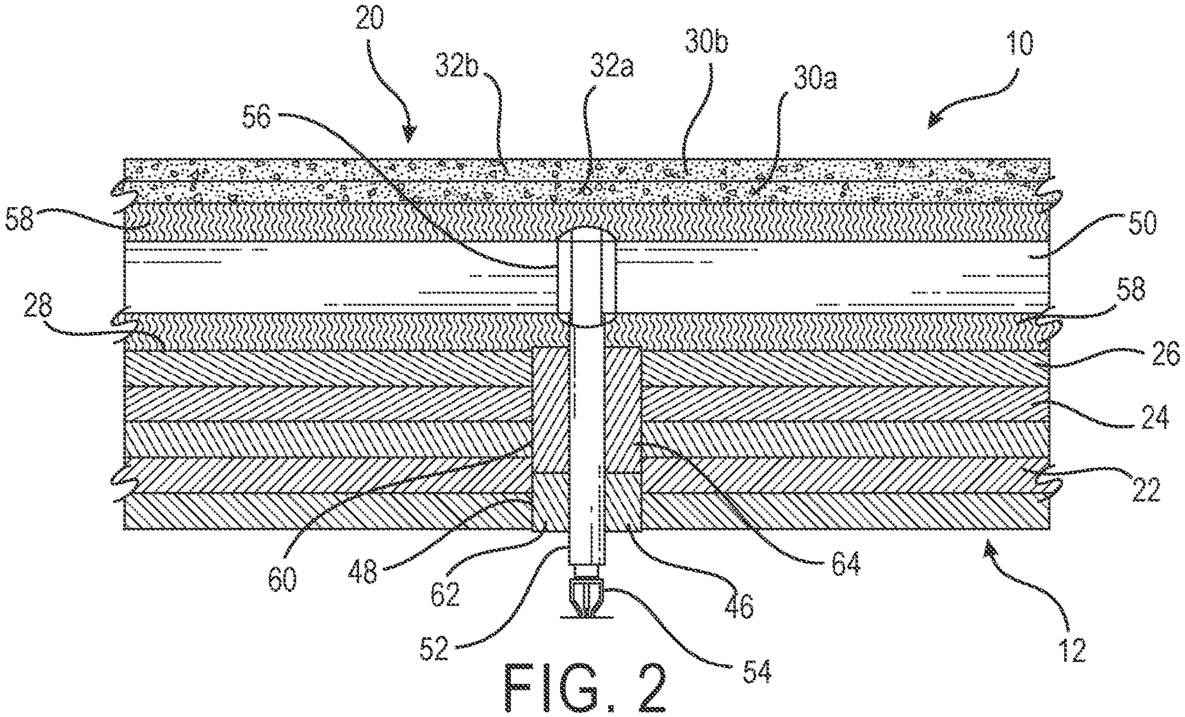
FIG. 2 is a schematic of the first embodiment of the present CLT building acoustic sprinkler drop flooring system.

Referring now to FIGS. 1A, 1B, and 2, in which the components are shown schematically and not to scale, the present cross-laminated timber (CLT) building acoustic sprinkler drop flooring system is generally designated 10 and includes a subfloor 12 with a plurality of acoustic isolators 14 disposed on top of the subfloor.

Conventionally, subfloors have been made with materials such as poured concrete or at least one layer of plywood as is known in the art. However, more recently, CLT has emerged as a popular material for use in subfloors. Specifically, CLT provides desirable mechanical properties, while being more cost effective than other conventional subfloor materials. As is known in the art, the subfloor 12 is optionally self-supporting between beams or is supported by joists (not shown) typically made of wood, steel, or concrete.

Additionally, a plurality of metal inverted "U"-tracks 16, each having a top surface 18, are attached to the plurality of acoustic isolators 14. An upper flooring 20 is secured to the top surface 18 of the inverted metal tracks 16.

The subfloor 12 has a plurality of layers 22 which preferably include CLT panels 24. In a preferred embodiment, each of the layers 22 is arranged such that the CLT panels 24 are oriented perpendicularly with respect to the CLT panels located on the layer immediately above or below. Preferably, the subfloor 12 includes between three and seven layers 22 of CLT panels 24, with five layers being the most preferred.

Additionally, a top layer 26 of the subfloor 12 includes an upper surface 28 upon which the plurality of acoustic isolators 14 are disposed. The acoustic isolators 14 are preferably rubber squares that are at least two inches tall as is known in the art. In a preferred embodiment, the acoustic isolators 14 are each spaced 24 inches away from the nearest acoustic isolator, and the acoustic isolators are evenly spaced upon the top layer 26.

The upper flooring 20 includes at least one structural panel layer 30 which is preferably made of a plurality of structural panels 32. In an embodiment, the structural panels 32 are not conventional gypsum wallboard, but are of the fiber-reinforced cement board type sold by United States Gypsum Co. (USG) as Structural Panel Concrete Subfloor, also sold under the trademark STRUCTO-CRETE® panels. Alternatively, the structural panels 32 are made of conventional gypsum wallboard panels. Preferably, the structural panels 32 are at least 0.5 inch tall.

Various types of panels are optionally used as the structural panels 32. The structural panels 32 are optionally fiber reinforced Portland cement panels, magnesium oxide cement panels, wood panels such as plywood or OSB covered with a noncombustible gypsum topping, cast Portland cement or Portland cement panels, gypsum cement concrete tiles, or other structural panels as are known in the art.

For example, U.S. Pat. No. 8,038,790 to Dubey et al., incorporated herein by reference, discloses cement panels able to resist lateral forces imposed by high wind and earthquake. The principal starting materials used to make the cement panels are inorganic binders, e.g., calcium sulfate alpha hemihydrate, hydraulic cement, and pozzolanic materials, lightweight filler coated expanded perlite and optional additional, ceramic microspheres or glass microspheres, as well as superplasticizer, e.g., polynapthalene sulphonates and/or polyacrylates, water, and optional additives.

Further, U.S. Pat. No. 6,620,487 to Tonyan et al., incorporated herein by reference, discloses a reinforced, lightweight, dimensionally stable panel capable of resisting shear, uniform, and concentrated loads when fastened to framing equal to or exceeding shear, uniform, and concentrated loads provided by plywood or oriented strand board panels. It is contemplated that the structural panels 32 optionally include cement panels made according to each of the preceding patents incorporated by reference.

Various methods are optionally employed to make the structural panels 32. For example, U.S. Pat. No. 7,670,520 to Dubey et al., incorporated by reference, discloses a process for producing fiber-reinforced structural cementitious panels made of at least one layer of fiber reinforced cementitious slurry, the process for each such layer of slurry including providing a moving web; depositing a first layer of individual, loose fibers upon the web; depositing a layer of settable slurry upon the deposited first layer of individual, loose fibers; depositing a second layer of individual, loose fibers upon the deposited layer of settable slurry; and actively embedding both layers of individual, loose fibers into the layer of slurry to distribute the fibers throughout the slurry.

Referring to FIG. 1A, in a preferred embodiment, the upper flooring 20 includes a bottom structural panel layer 30*a* and a top structural panel layer 30*b* where the structural panels 32*a* of bottom structural panel layer are oriented perpendicularly to the structural panels 32*b* of the top structural panel layer. Alternatively, a parallel orientation of the top structural panels 32*b* and the bottom structural panels 32*a* is also possible provided the joints of the top structural layer 30*b* are staggered when compared to the bottom structural layer 30*a*.

The bottom structural panels 32*a* are attached to the upper surface 18 of the inverted metal tracks 16 by either fasteners, an adhesive 34 or a combination of fasteners and the adhesive. In an embodiment, the bottom structural panels 32*a* are attached to the inverted metal tracks 16 with fasteners such as screws, nails, or other fasteners as are known in the art. Alternatively, a combination of the adhesive 34 and fasteners are used to attach the bottom structural panels 32*a* to the inverted metal tracks 16, such that the fasteners are either removed once the adhesive sets or remain after the adhesive has set.

Similarly, the adhesive 34 is preferably used to attach the bottom structural panel layer 30*a* to the top structural panel layer 30*b*. In a preferred embodiment, a combination of the adhesive 34 and fasteners are used to attach the top structural panels 32*b* to the bottom structural panels 32*a*, such that the fasteners secure the top structural panels to the bottom structural panels and the inverted metal track 16 and are either removed once the adhesive sets or remain after the adhesive has set. Optionally, the top structural panels 32*b* are secured only to the bottom structural panels 32*a* and are optionally secured only by fasteners. A preferred, but non-limiting adhesive is LiquidNails® adhesive.

Referring to FIG. 1B, an alternate preferred embodiment of the flooring system 10 includes an alternate upper flooring 40 which includes the bottom structural panel layer 30*a* with the bottom structural panels 32*a* but omits the top structural panel layer 30*b*. Instead of the top structural panel layer 30*b*, the upper flooring 40 includes a sound mat 42 placed on top of the bottom structural panels 32*a*, and a floor underlayment 44 poured onto the sound mat 42. The adhesive 34 is optionally used to secure the sound mat 42 to the bottom structural panels 32*a*. It is also contemplated that the upper flooring 40 omits the sound mat 42, such that the floor underlayment 44 is poured onto the bottom structural panels 32*a*.

A preferred sound mat 42 is Levelrock® SAM-N25 Sound Attenuation Mat sold by USG, and a preferred underlayment is one inch Levelrock® 2500 Floor Underlayment sold by USG.

Referring now to FIG. 2, the subfloor 12 includes a plurality of drop holes 46 which extend through the subfloor. An outer edge 48 of the drop holes 46 preferably is circular and has a diameter of at least four inches. A sprinkler main 50 is located in the space between the upper flooring 20 and the subfloor 12. Preferably, the space between the top layer 26 of the subfloor 12 and the bottom structural panel layer 30*a* is at least four inches thick, and the sprinkler main 50 is a 3-inch Victaulic sprinkler main. A sprinkler drop 52, which includes a sprinkler head 54, is disposed within the drop hole 46. Preferably, the only portion of the sprinkler drop 52 which extends beyond the bottom of the subfloor 12 is the sprinkler head 54.

The sprinkler main 50 includes a connection 56 with the sprinkler drop 52. In a preferred embodiment, the space surrounding the sprinkler main 50 includes insulation 58 which may be foam, fiberglass or the like, as is known in the art.

A space 60 between the outer edge 48 of the drop holes 46 and the sprinkler drop 52 is preferably filled with a combination of an intumescent caulk 62 and a slurry 64. Preferably, the intumescent caulk 62 covers the bottom of the space 60, and a slurry 64 is poured on top of the intumescent caulk to fill the remaining portion of the space. Pouring the slurry 64 above the intumescent caulk 62 seals the drop holes 46 to reduce fire and smoke spread. The slurry 64 is preferably a gypsum filler such as Pavement Patch or LEVELROCK® floor underlayment sold by USG. In a preferred embodiment, the intumescent caulk 62 fills between the bottom 1-inch and 2-inches of the space 60.

The present CLT building acoustic sprinkler drop flooring system 10 provides improved sound reduction compared to conventional flooring systems. In particular, the CLT building acoustic sprinkler drop flooring system 10 has a measured impact insulation class (IIC) rating of 61.

The CLT building acoustic sprinkler drop flooring system 10 is preferably built by assembling the subfloor 12 and drilling the drop holes 46 through the subfloor at desired locations. Next, the isolators 14 are attached to the upper layer 26, and the sprinkler main 50 is placed over the upper layer such that the sprinkler drops 52 align with the drop holes 46. Then, the inverted metal tracks 16 are placed on top of the isolators 14.

The intumescent caulk 62 is then used to fill the bottom portion of the drop holes 46. After applying the intumescent caulk 62, the slurry 64 is poured to fill the remainder of the space 60. The insulation 58 is preferably applied around the sprinkler system 50 either before or after the drop holes 46 are filled.

Next, the bottom structural panel layer 30*a* is placed on the upper surface 18 of the inverted metal tracks and the adhesive 34 is preferably used to secure the bottom structural panel layer 30*a* to the upper surface 18.

Further, in the embodiment with the upper flooring 10, the top structural panel layer 30*b* is attached to the bottom structural panel layer 30*a* with the adhesive 34. Preferably, fasteners are used to secure the top and bottom structural panel layers 30*a*, 30*b* until the adhesive sets. In the alternate embodiment with the upper flooring 40, the optional sound mat 42 is placed on top of the bottom structural panels 32*a*, and the floor underlayment 44 is poured onto the sound mat 42.

While a particular embodiment of the present cross-laminated timber (CLT) building acoustic sprinkler drop flooring system has been described herein, it will be appreciated by those skilled in the art that changes and modifications may be made thereto without departing from the invention in its broader aspects and as set forth in the following claims.

The invention claimed is:

1. A composite flooring system comprising:

a cross-laminated timber (CLT) subfloor including a plurality of drop holes;

a plurality of isolators disposed on top of and attached to said CLT subfloor;

a sprinkler main of a sprinkler system disposed between said plurality of isolators;

a plurality of sprinkler drops attached to said sprinkler main which extend through said drop holes of said CLT subfloor, wherein a sprinkler head of said sprinkler drop is disposed entirely below said CLT subfloor;

a plurality of metal inverted tracks attached to a top surface of said plurality of isolators, such that one of said plurality of metal inverted tracks is attached to multiple of said plurality of isolators which are spaced apart from one another; and an upper flooring attached to a top surface of said metal inverted tracks, wherein a space between said CLT subfloor and said upper flooring is filled with a foam or fiberglass insulation which abuts each of said plurality of isolators.

2. The composite flooring system of claim 1, wherein said CLT subfloor comprises five layers of CLT panels, such that successive layers of the five layers of the CLT panels are stacked in a perpendicular orientation relative to one another.

3. The composite flooring system of claim 1, wherein said upper flooring comprises two layers of structural panels stacked in a perpendicular orientation or in a parallel orientation with staggered joints between said layers of structural panels.

4. The composite flooring system of claim 3, wherein said two layers of structural panels are attached with an adhesive or a combination of the adhesive and fasteners.

5. The composite flooring system of claim 1, wherein said upper flooring comprises a layer of structural panels with a poured underlayment above said layer of structural panels.

6. The composite flooring system of claim 5, wherein said upper flooring comprises a sound mat disposed between said layer of structural panels and said poured underlayment.

7. The composite flooring system of claim 1, wherein said isolators are at least 4 inches tall.

8. The composite flooring system of claim 1, wherein a space between an outer edge of said drop holes in said CLT subfloor and said sprinkler drops is filled with a layer of intumescent caulk and a gypsum filler.

9. The composite flooring system of claim 8, wherein said intumescent caulk fills a bottom inch of said space, and said gypsum filler fills the remainder of said space.

10. The composite flooring system of claim 1, wherein said acoustic isolators are spaced 24 inches apart.

11. The composite flooring system of claim 1, wherein:

said sprinkler head of said sprinkler drop is an only portion of said sprinkler system which extends beyond a bottom of said CLT subfloor.

12. A composite flooring system comprising:

a cross-laminated timber (CLT) subfloor including a plurality of drop holes;

a plurality of isolators disposed on top of and attached to said CLT subfloor;

a sprinkler main of a sprinkler system disposed between said plurality of isolators;

a plurality of sprinkler drops attached to said sprinkler main which extend through said drop holes of said CLT subfloor, wherein a space between an outer edge of said drop holes and said sprinkler drops is filled with a layer of intumescent caulk and a gypsum filler, such that said intumescent caulk fills a bottom inch of said space, and said gypsum filler fills the remainder of said space;

a plurality of metal inverted tracks attached to a top surface of said plurality of isolators; and an upper flooring attached to a top surface of said metal inverted tracks.

13. A method of assembling a composite flooring system comprising:

providing a cross-laminated timber (CLT) subfloor;

drilling a plurality of drop holes through the CLT subfloor;

attaching a plurality of isolators to a top surface of said CLT subfloor;

disposing a sprinkler main of a sprinkler system between said plurality of isolators;

disposing a plurality of sprinkler drops of said sprinkler system through the drop holes;

attaching a plurality of metal inverted tracks to a top surface of said plurality of isolators;

attaching an upper flooring to a top surface of said metal inverted tracks;

filling a space between an outer edge of said drop holes in said CLT subfloor and said sprinkler drops with a layer of intumescent caulk, such that said intumescent caulk fills a bottom inch of said space; and filling a remainder of the space between the outer edge of said drop holes in said CLT subfloor and said sprinkler drops with a gypsum filler.

14. The method of assembling a composite flooring system of claim 13, wherein said CLT subfloor comprises five layers of CLT panels, such that successive layers of the fiver layers of the CLT panels are stacked in a perpendicular orientation relative to one another.

15. The method of assembling a composite flooring system of claim 13, wherein said upper flooring comprises two layers of structural panels stacked in a perpendicular orientation or in a parallel orientation with staggered joints between said layers of structural panels.

16. The method of assembling a composite flooring system of claim 15, further comprising:

applying an adhesive between said two layers of structural panels; and fastening said two layers of structural panels to said metal inverted tracks until said adhesive has cured.

17. The method of assembling a composite flooring system of claim 13, wherein said isolators are at least 4 inches tall.

18. The method of assembling a composite flooring system of claim 13, further comprising:

filling a space between said CLT subfloor and said upper flooring with insulation.

19. The method of assembling a composite flooring system of claim 13, wherein:

said acoustic isolators are spaced 24 inches apart.

* * * * *